US012602760B2

(12) United States Patent
Kim et al.

(10) Patent No.: US 12,602,760 B2
(45) Date of Patent: Apr. 14, 2026

(54) METHOD AND APPARATUS FOR DETECTING DEFECT BASED ON PHASED PASS/FAIL DETERMINATION

(71) Applicant: HYUNDAI MOBIS CO., LTD., Seoul (KR)

(72) Inventors: Tae Hyun Kim, Seoul (KR); Yu Min Cho, Hwaseong-si (KR); Kyu Ha Song, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 861 days.

(21) Appl. No.: 17/891,302

(22) Filed: Aug. 19, 2022

(65) Prior Publication Data

US 2023/0058809 A1 Feb. 23, 2023

(30) Foreign Application Priority Data

Aug. 20, 2021 (KR) ........................ 10-2021-0110497

(51) Int. Cl.
*G06T 7/00* (2017.01)
*G06T 7/11* (2017.01)
*G06T 7/13* (2017.01)
*G01N 21/88* (2006.01)

(52) U.S. Cl.
CPC .............. *G06T 7/0004* (2013.01); *G06T 7/11* (2017.01); *G06T 7/13* (2017.01); *G01N 2021/8887* (2013.01); *G06T 2207/10152* (2013.01); *G06T 2207/20081* (2013.01); *G06T 2207/20132* (2013.01); *G06T 2207/30108* (2013.01)

(58) Field of Classification Search
CPC . G06T 7/0004; G06T 7/11; G06T 7/13; G06T 2207/10152; G06T 2207/20081; G06T 2207/20132; G06T 2207/30108; G06T 2207/20084; G06T 7/187; G01N 2021/8887; G01N 2021/8883; G06F 18/2413
See application file for complete search history.

(56) References Cited

U.S. PATENT DOCUMENTS

| 2017/0358071 | A1* | 12/2017 | Yamaoka | ................ H04N 7/183 |
| 2020/0364906 | A1* | 11/2020 | Shimodaira | ............ G06V 10/82 |
| 2021/0027440 | A1* | 1/2021 | Sakuyama | ......... G01N 21/9515 |
| 2022/0044383 | A1* | 2/2022 | Koshihara | ............ G06V 10/454 |
| 2022/0284699 | A1* | 9/2022 | Walt | ...................... G06V 10/95 |
| 2023/0005120 | A1* | 1/2023 | Kondo | .................... G06T 7/001 |

FOREIGN PATENT DOCUMENTS

JP 2020024121 A * 2/2020 ............. G01N 21/88

* cited by examiner

*Primary Examiner* — Michael P LaPage
(74) *Attorney, Agent, or Firm* — Novo TechIP International PLLC

(57) ABSTRACT

A method and an apparatus for detecting a defect based on a phased pass/fail determination are disclosed. According to at least one aspect of the present disclosure, a method comprising: a process of acquiring a product image which is an image of the product; a first determination process of inputting the product image into a first determination model to perform a pass/fail determination for the product; and a second determination process of inputting the product image into a second determination model to perform a pass/fail determination for the product when the product is determined to be undeterminable as a result of the pass/fail determination of the first determination process.

9 Claims, 3 Drawing Sheets

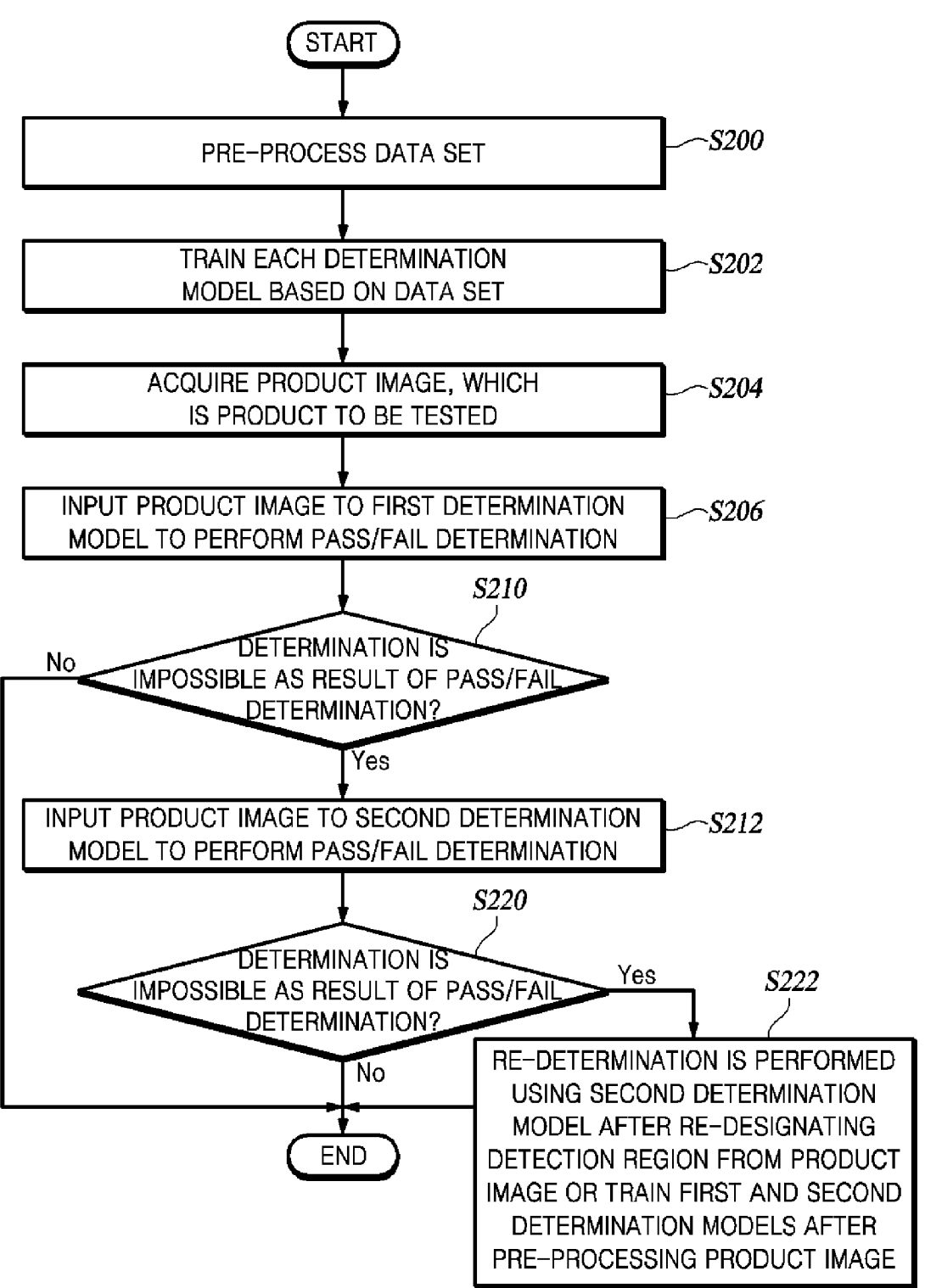

START

PRE-PROCESS DATA SET — S200

TRAIN EACH DETERMINATION MODEL BASED ON DATA SET — S202

ACQUIRE PRODUCT IMAGE, WHICH IS PRODUCT TO BE TESTED — S204

INPUT PRODUCT IMAGE TO FIRST DETERMINATION MODEL TO PERFORM PASS/FAIL DETERMINATION — S206

S210
DETERMINATION IS IMPOSSIBLE AS RESULT OF PASS/FAIL DETERMINATION?
No
Yes

INPUT PRODUCT IMAGE TO SECOND DETERMINATION MODEL TO PERFORM PASS/FAIL DETERMINATION — S212

S220
DETERMINATION IS IMPOSSIBLE AS RESULT OF PASS/FAIL DETERMINATION?
Yes
No

S222
RE-DETERMINATION IS PERFORMED USING SECOND DETERMINATION MODEL AFTER RE-DESIGNATING DETECTION REGION FROM PRODUCT IMAGE OR TRAIN FIRST AND SECOND DETERMINATION MODELS AFTER PRE-PROCESSING PRODUCT IMAGE

END

FIG. 2

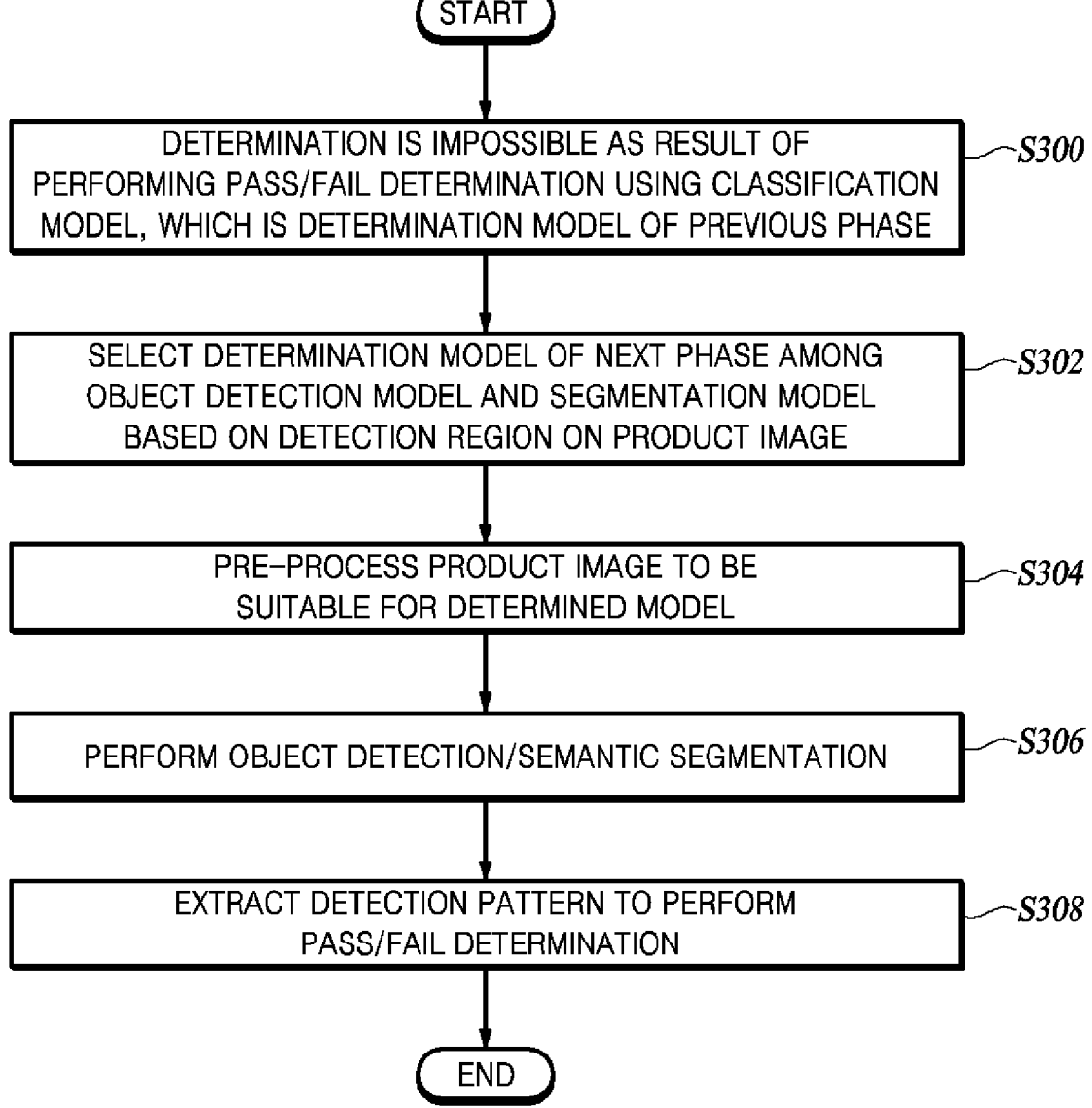

START

DETERMINATION IS IMPOSSIBLE AS RESULT OF PERFORMING PASS/FAIL DETERMINATION USING CLASSIFICATION MODEL, WHICH IS DETERMINATION MODEL OF PREVIOUS PHASE —S300

SELECT DETERMINATION MODEL OF NEXT PHASE AMONG OBJECT DETECTION MODEL AND SEGMENTATION MODEL BASED ON DETECTION REGION ON PRODUCT IMAGE —S302

PRE-PROCESS PRODUCT IMAGE TO BE SUITABLE FOR DETERMINED MODEL —S304

PERFORM OBJECT DETECTION/SEMANTIC SEGMENTATION —S306

EXTRACT DETECTION PATTERN TO PERFORM PASS/FAIL DETERMINATION —S308

END

*FIG. 3*

METHOD AND APPARATUS FOR DETECTING DEFECT BASED ON PHASED PASS/FAIL DETERMINATION

CROSS-REFERENCE TO RELATED APPLICATIONS

This application is based on, and claims priority to, Korean Patent Application Number 10-2021-0110497, filed on Aug. 20, 2021, the disclosure of which is incorporated by reference herein in its entirety.

TECHNICAL FIELD

The present disclosure relates to a method and an apparatus for detecting a defect based on a phased pass/fail determination.

BACKGROUND

The description in this section merely provides background information related to the present disclosure and does not necessarily constitute the related art.

In order to detect a product defect, a rule-based model has been conventionally used. The rule base model is a model that recognizes a pattern from an image of a product, measures a length or an area of the pattern, and determines whether the pattern conforms to a pre-stored rule.

However, the rule-based model is inconvenient in that a new rule needs to be manually added whenever a new product is added as a determination target. In addition, there is a large difference in detection performance depending on the image quality of a product for which pass/fail is to be determined. The image quality of a product acquired from a vision test apparatus is greatly affected by a minute change in location of process equipment, aging of equipment lighting, and weather changes. When the image quality of a product is poor, the rule-based model may misrecognize a detection region or fail to recognize the pattern. When misrecognition of the detection region or failure of pattern recognition occurs, the determination probability of the rule-based model decreases or the accuracy of determination decreases.

Failure to filter out false defective products in the process causes delays in the process cycle or causes defective products to be delivered to clients. When defects in assembly are not filtered out, products in an abnormally assembled state are delivered, resulting in defects in the performance of finished products.

SUMMARY

According to at least one embodiment, the present disclosure provides a method of detecting a defect of a product, comprising: acquiring a product image of the product; inputting the product image into a first determination model trained to perform a first pass/fail determination of the product; extracting, from the first determination model, a first determination result; inputting the product image to a second determination model trained to perform a second pass/fail determination in response to the first determination result indicating that the first determination model failed to perform the first pass/fail determination; extracting, from the second determination model, a second determination result of the second pass/fail determination; and determining, based on the second determination result, whether the product has a defect.

According to another embodiment, the present disclosure provides a system for detecting a defect of a product, comprising: a processor; and a computer-readable medium in communication with the processor and storing instructions that, when executed by the processor, cause the processor to control the system to perform the method for detecting the defect of the product.

BRIEF DESCRIPTION OF THE DRAWINGS

FIG. 2 is a flowchart illustrating a method for detecting a defect according to an embodiment of the present disclosure.

FIG. 3 is a flowchart illustrating a method for detecting a defect for a product determined to be undeterminable according to an embodiment of the present disclosure.

DETAILED DESCRIPTION

Figure 1:
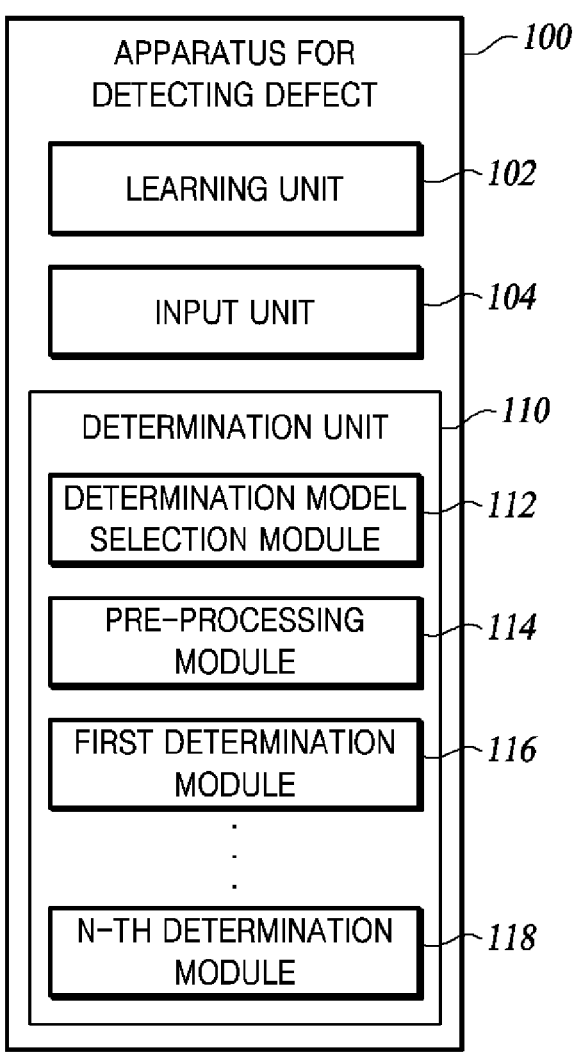
FIG. 1 is a block diagram illustrating an apparatus for detecting a defect according to an embodiment of the present disclosure.

According to an aspect of the present disclosure, a phased pass/fail determination may be performed using a plurality of pass/fail determination models.

According to an aspect of the present disclosure, a classification model may be primarily used as a plurality of pass/fail determination models, and an object detection model or a segmentation model may be secondarily used for a product determined to be undeterminable.

The aspects of the present disclosure are not limited to the foregoing, and other aspects not mentioned herein will be able to be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

In describing the components of the embodiments, alphanumeric codes may be used such as first, second, i), ii), a), b), etc., solely for the purpose of differentiating one component from others but not to imply or suggest the substances, the order, or sequence of the components. Throughout this specification, when parts "include" or "comprise" a component, they are meant to further include other components, not to exclude thereof unless there is a particular description contrary thereto.

The description of the present disclosure to follow in conjunction with the accompanying drawings is intended to describe exemplary embodiments of the present disclosure and is not intended to represent the only embodiments in which the technical idea of the present disclosure may be practiced.

An embodiment of the present disclosure discloses a defect detection method and apparatus for performing phased pass/fail determination on an image of a product in order to detect a defect of the product.

Defects to be detected in an embodiment of the present disclosure may include not only defects in the product itself having a single configuration, but also defects in each configuration or defects in a coupling relationship between configurations for a product including a plurality of configurations, and the like, but are not limited thereto.

A method for detecting a defect of an embodiment of the present disclosure is executed by an apparatus for detecting a defect, and the apparatus for detecting the defect is executed on a computing device. The apparatus for detecting the defect performs each function by one or more processors available in a computing device, and includes a computer-readable storage having instructions stored therein in connection with the processor.

FIG. 1 is a block diagram illustrating an apparatus for detecting a defect according to an embodiment of the present disclosure.

An apparatus 100 for detecting a defect according to an embodiment of the present disclosure includes all or part of a learning unit 102, an input unit 104, and a determination unit 110. The apparatus 100 for detecting the defect illustrated in FIG. 1 is in line with an embodiment of the present disclosure, and not all components illustrated in FIG. 1 are essential components, and some components may be added, changed, or deleted in other embodiments. For example, in another embodiment, an apparatus for detecting a defect may further include an analysis unit (not shown) that analyzes the characteristics of the product when it is determined that the pass/fail determination of the input product is impossible even with the performance of the phased pass/fail determination of a determination unit 106.

FIG. 1 illustrates the apparatus 100 for detecting the defect as an apparatus, this is for convenience of description, and in another embodiment, the apparatus for detecting the defect may be implemented as a software module or processor performing the functions of each component 102 to 110.

The learning unit 102 trains each determination model of the determination unit 110 using a data set including an image of each of a plurality products and a label corresponding to the image.

The learning unit 102 may perform pre-processing on the data set prior to training each determination model. For example, the learning unit 102 may transform each data of the data set to be suitable for learning of each determination model. The learning unit 102 may transform the data of the data set so that the attribute information that the determination model does not use for pass/fail determination is excluded. For example, in the case where color information of pixels of an image is not used as a parameter of the pass/fail determination of a specific determination model, the learning unit 102 converts the image into gray scale to reduce the size of the data set. When the determination model is a model that performs prediction by extracting a partial region from an image of a product, the learning unit 102 extracts a detection region from the product image, and extracts a detection pattern from the detection region to train each determination model to perform a pass/fail determination. For example, when the determination model is an object detection model or a segmentation model, the learning unit 102 may perform pre-processing by cropping a region excluding a detection region on the image.

In order for the data of the data set to be input to the network of each determination model, the learning unit 102 may downscale/upscale or crop the images of the data set to convert the images to the same size. In order to train each learning model based on data having various feature values, the learning unit 102 may perform data augmentation. For example, in order to minimize the influence of illuminance or weather in the determination, the learning unit 102 may randomly change the illuminance and/or contrast of the image of the data set to be included in the data set.

The input unit 104 acquires an image of a product for which pass/fail is to be determined. The image of the product may further include coordinate label information. The input unit 104 may receive an image of the product and/or a coordinate label of the image captured from an external photographing device (not shown). Alternatively, an image of a product captured by a photographing device (not shown) mounted on the apparatus 100 for detecting the defect 10 and/or a coordinate label of the image may be referred to or transmitted. The image acquired by the input unit 104 and/or the coordinate label of the image becomes input data of each determination model.

The determination unit 110 uses a plurality of different deep learning-based determination models in phases to perform pass/fail determination of a product. The determination unit 110 may perform the pass/fail determination quickly and accurately by using the determination model in phases according to the difficulty of detecting a defect.

The determination unit 110 according to an embodiment of the present disclosure include all or part of a determination model selection module 112, a pre-processing module 114, a first determination module 116, and an N-th determination module 118. Here, N is the number of phases in which the determination unit 110 performs determination, and is a natural number of 2 or more. The determination unit 110 illustrated in FIG. 1 is in line with an embodiment of the present disclosure, and not all components illustrated in FIG. 1 are essential components, and some components may be added, changed, or deleted in other embodiments. For example, in another embodiment, the determination unit may further include a determination unit (not shown) for determining N, which is a phase to be determined.

The determination model selection module 112 decides a deep learning-based determination model to be used for each determination phase. The determination model selection module 112 may decide a classification model having a high computation speed as a first-stage determination model by performing classification prediction in units of images. However, when a detection region is local, the accuracy of the determination or the determination probability may be deteriorated only with the classification model. Here, the determination probability means a probability that a product is good or defective. Accordingly, the determination model selection module 112 may decide an object detection model or a segmentation model as a determination model of the next phase. The object detection model may perform prediction on a local region by extracting a bounding box or an edge from an image. The segmentation model may perform prediction in units of pixels to perform prediction on a detection region having a form that is difficult to be designated by a bounding box or edge. The determination model selection module 112 may decide a determination model of each phase from among the pre-learned determination models.

The classification model may be SENet, GoggleNet, MobileNet or ShuffleNet, but is not limited thereto. The object detection model may be a Yolo-type model or an R-CNN-type model, but is not limited thereto. The object detection model may be a model in which a Feature Pyramid Network (FPN) is added to the aforementioned model. The object detection model may be a model that performs classification and localization of a class of a detected object. The segmentation model may be, but is not limited to, Mask R-CNN, PSPNet, DeepLabV3+, U-Net, or EfficientNet.

The determination model selection module 112 may decide a determination model only in some phases. As a result of the first determination of the classification model, in order to perform a second determination on a product determined to be undeterminable, the determination model selection module 112 may decide any one of the object detection model and the segmentation model as a determination model of the second determination. Specifically, the determination model selection module 112 may decide a determination model according to a detection region on an image of a product. For example, it is determined whether the form of the detection region may be designated as one box. As a result of determination, when it is determined that it is not possible to designate the form as a box, the segmentation model is decided as the secondary determination model. When it is determined that it is possible to designate the form as a box, the object detection model may be decided as the secondary determination model.

Each determination model may be implemented to predict whether input data belongs to a specific class by using an activation function that calculates a probability of belonging to each class, such as a softmax activation function in the last layer. Accordingly, the determination model selection module 112 may set a threshold probability for each determination model. The determination model selection module 112 may set a threshold probability for each determination model. The determination model selection module 112 may set a threshold probability for each phase so that the threshold probability increases as the pass/fail determination phase deepens. Each determination model may determine that the determination target is undeterminable when the calculated determination probability is less than a set threshold probability.

The pre-processing module 114 performs pre-processing of converting input data into a format that may be input to the determination model. As a pre-processing method, the pre-processing module 114 may perform resizing of an image, gray-scale conversion of an image, and/or scaling of a coordinate label, but is not limited to this pre-processing method. The pre-processing module 114 performs pre-processing on the input data determined to be undetermined even by the determination of the first determination module 116 to the N-th determination module 118, so that the pass/fail judgment may be re-performed or may be made a learning target for each model. The learning unit 102 may use the input data before pre-processing to re-train each determination model by using the pass/fail determination result by the pre-processed input data as a label.

The first determination module 116 to the N-th determination module 118 perform pass/fail determination of input data in phases by using a determination model preset or determined by the determination model selection module 112. The input data determined to be undeterminable as a result of the pass/fail determination in the previous phase becomes the pass/fail determination target in the next phase.

Hereinafter, a case where N is 2 will be described as an example. The first determination module 116 inputs input data to the classification model. When the classification model is used, the first determination module 116 calculates a class having the highest probability as a pass/fail determination result when the determination probability is equal to or greater than a preset threshold probability. This pass/fail determination result indicates whether a product of a pass/fail determination target is good or defective. In this connection, the operation of the determination unit 110 may be terminated without performing the pass/fail determination of the next phase.

The N-th determination module 118 inputs the input data determined to be undeterminable as a result of the determination of the first determination module 116 to the determination model, and performs a pass/fail determination. When the determination model is an object detection model, the object detection model performs object detection from input data to calculate a detection region (or a bounding box, hereinafter omitted). The object detection model may extract a detection pattern from the detection region to perform a pass/fail determination. For example, when a distance between each component of a product is required to be within a certain range as a good product determination criterion, the object detection model may determine whether a distance between the detection regions falls within the aforementioned range and perform a pass/fail determination when the number of detection regions is equal to or greater than the reference number set to correspond to the number of good product components.

When the determination model of the N-th determination module 118 is a segmentation model, the segmentation model calculates a segmentation map by performing semantic segmentation on input data. Here, the semantic segmentation is a method of classifying the pixels of an image only as a class, which is a semantic unit, without separately distinguishing instances in the image, that is, objects belonging to the same class but different from each other. The segmentation model may perform a pass/fail determination by extracting a detection pattern from a segmentation map.

With respect to the input data determined to be undetermined even by the determination by the N-th determination module 118, the determination unit 110 may causes the N-th determination module 118 to readjust a detection region of the input data to perform a pass/fail determination again.

FIG. 2 is a flowchart illustrating a method for detecting a defect according to an embodiment of the present disclosure.

FIG. 2 illustrates a method for detecting a defect configured of two phases, that is, when N=2.

The apparatus for detecting the defect pre-processes a data set (S200). The data set may include an image of each product and a label for each image. When the data of the data set does not include images of various features, the apparatus for detecting the defect may perform pre-processing by performing data augmentation. Alternatively, pre-processing may also be performed by transforming the data of the data set into a format suitable for training each determination model.

The apparatus for detecting the defect trains each determination model based on the data set (S202).

The apparatus for detecting the defect acquires a product image, which is an image of a product to be tested, as input data (S204). The product image may further include coordinate label information for the image.

The apparatus for detecting the defect inputs the product image to the first determination model to perform a pass/fail determination (S206), a result of which may be extracted from the first determination model.

The apparatus for detecting the defect determines whether the determination is impossible as a result of the pass/fail determination in S206 (S210).

When it is determined in S210 that the determination is not impossible, the procedure ends.

When it is determined in S210 that the determination is impossible, the apparatus for detecting the defect inputs the product image to the second determination model to perform a pass/fail determination (S212), of which the result may be extracted from the second determination model and used for determining whether the product has a defect or not.

The apparatus for detecting the defect determines whether the determination is impossible as a result of the pass/fail determination in S212 (S220).

When it is determined in S220 that the determination is not impossible, the procedure ends.

When it is determined in S220 that the determination is impossible, the apparatus for detecting the defect may re-designate the detection region from the product image to perform determination again, or may pre-process the product image to train the determination model (S222). Specifically, the apparatus for detecting the defect adjusts a parameter designating a detection region. Thereafter, the second determination model performs pass/fail determination again on the readjusted detection region. Alternatively, the apparatus for detecting the defect may pre-process the product image, analyze the cause of the impossibility of determination, and re-train each determination model. By performing S222, the apparatus for detecting the defect may improve the performance of each determination model by re-learning a point where learning was vulnerable in the conventional learning process.

FIG. 3 is a flowchart illustrating a method for detecting a defect for a product determined to be undeterminable according to an embodiment of the present disclosure.

As a result of the apparatus for detecting the defect performing a pass/fail determination using the classification model, which is the determination model of the previous phase, it is determined that determination is impossible (S300).

The apparatus for detecting the defect selects a determination model of the next phase among the object detection model and the segmentation model based on the detection region on the product image (S302). The apparatus for detecting the defect may decide a determination model of the next phase by determining whether the form of a detection region may be designated by a bounding box or an edge.

The apparatus for detecting the defect pre-processes the product image to be suitable for the determined model (S304).

The apparatus for detecting the defect performs object detection or semantic segmentation according to the determined model (S306).

The apparatus for detecting the defect extracts a detection pattern based on the object detection result or the semantic segmentation result to perform a pass/fail determination of the product (S308).

Although each process in FIGS. 2 and 3 is described to be sequentially executed, this is merely illustrative of the technical idea of an embodiment of the present disclosure. In other words, one of ordinary skill in the art to which an embodiment of the present disclosure pertains may change and perform the order described in FIGS. 2 and 3 within a range that does not depart from the essential characteristics of an embodiment of the present disclosure, or may apply various modifications and variations by executing one or more processes in parallel among each process. Accordingly, this is not limited to a time-series order of FIGS. 2 and 3.

Various implementations of the apparatuses, units, processes, phases, etc., described herein may be implemented by digital electronic circuits, integrated circuits, field programmable gate arrays (FPGAs), application specific integrated circuits (ASICs), computer hardware, firmware, software, and/or a combination thereof. These various implementations may include being implemented in one or more computer programs executable on a programmable system. The programmable system includes at least one programmable processor (which may be a special purpose processor or a general purpose processor) coupled to receive data and instructions from, and transmit data and instructions to, a storage system, at least one input device, and at least one output device. Computer programs (also known as programs, software, software applications or code) include instructions for a programmable processor and are stored on a "computer-readable recording medium."

The computer-readable recording medium includes all types of recording devices in which data readable by a computer system is stored. These computer-readable recording media may further include non-volatile or non-transitory media, such as ROM, CD-ROM, magnetic tape, floppy disk, memory card, hard disk, magneto-optical disk, storage device, etc. In addition, the computer-readable recording medium may be distributed in network-connected computer systems, and the computer-readable code may be stored and executed in a distributed manner.

Various implementations of the systems and techniques described herein may be implemented by a programmable computer. Here, the computer includes a programmable processor, a data storage system (including volatile memory, non-volatile memory, or other types of storage systems or combinations thereof) and at least one communication interface. For example, the programmable computer may be one of a server, a network appliance, a set-top box, an embedded device, a computer expansion module, a personal computer, a laptop, a Personal Data Assistant (PDA), a cloud computing system, or a mobile device.

According to an aspect of the present disclosure, it is possible to efficiently detect product defects by performing phased pass/fail determination using a plurality of pass/fail determination models.

According to an aspect of the present disclosure, a classification model is primarily used as a plurality of pass/fail determination models, and an object detection model or a segmentation model is secondarily used for a product determined to be undeterminable, thereby more efficiently detecting undeterminable products while minimizing a cycle delay of a process.

The advantages of the present disclosure are not limited to those mentioned above, and other advantages not mentioned herein will be clearly understood by those skilled in the art from the following description.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A method of detecting a defect of a product, comprising:
  acquiring a data set including a product image of the product;
  inputting the data set into a first determination model trained to perform a first pass/fail determination of the product;
  extracting, from the first determination model, a first determination result;

determining whether the first determination result indicates that the first determination model failed to perform the first pass/fail determination;

in response to the first determination result indicating that the first determination model failed to perform the first pass/fail determination, inputting the data set to a second determination model trained to perform a second pass/fail determination;

extracting, from the second determination model, a second determination result of the second pass/fail determination; and determining, based on the second determination result, whether the product has a defect, wherein inputting the data set into the second determination model comprises inputting the data set to a deep learning-based object detection model or a deep learning-based segmentation model trained to perform the second pass/fail determination based on a detection region in the product image included the acquired data set, and wherein the second pass/fail determination includes:

determining whether a shape of the detection region is designated by a bounding box or an edge, and selecting the segmentation model as the second determination model in response to determining that the shape of the detection region is not designated by the bounding box or the edge.

2. The method of claim 1, wherein:

inputting the product image into the first determination model comprises inputting the product image to a deep learning-based classification model, and inputting the product image into the second determination model comprises inputting the product image to a deep learning-based object detection model or a deep learning-based segmentation model.

3. The method of claim 1, wherein inputting the product image into the second determination model comprises inputting the product image into a deep learning-based object detection model trained to:

detect one or more detection regions in the acquired product image;

determine whether a number of the detection regions meet a predetermined number threshold;

calculate a distance between the detection regions in response to the number of the detection regions meeting the predetermined number threshold; and perform, based on the distance, the second pass/fail determination.

4. The method of claim 1, further comprising training the first determination model and the second determination model using a data set including an image of each of a plurality of products and a label corresponding to the image.

5. The method of claim 4, wherein training the first determination model comprises:

generating a first image in which at least one of an illuminance and contrast of the image included in the data set is randomly changed, and including the generated first image in the data set.

6. The method of claim 1, further comprising:

adjusting the detection region of the product image in response to the second determination result indicating that the second determination model failed to perform the second pass/fail determination of the product; and inputting the product image having the adjusted detection region to the second determination model to reperform the second pass/fail determination.

7. The method of claim 1, further comprising, pre-processing the product image to transform a data set representing the product image to be suitable for the first determination model or the second determination model in response to the second determination result indicating that the second determination model failed to perform the second pass/fail determination of the product.

8. A system for detecting a defect of a product, comprising:

a processor; and a computer-readable medium in communication with the processor and storing instructions that, when executed by the processor, cause the processor to control the system to perform the method of claim 1.

9. A method of detecting a defect of a product, comprising:

acquiring a data set including a product image of the product;

inputting the data set into a first determination model trained to perform a first pass/fail determination of the product;

extracting, from the first determination model, a first determination result;

determining whether the first determination result indicates that the first determination model failed to perform the first pass/fail determination;

in response to the first determination result indicating that the first determination model failed to perform the first pass/fail determination, inputting the data set to a second determination model trained to perform a second pass/fail determination;

extracting, from the second determination model, a second determination result of the second pass/fail determination; and determining, based on the second determination result, whether the product has a defect, wherein inputting the data set into the second determination model comprises inputting the data set to a deep learning-based object detection model or a deep learning-based segmentation model trained to perform the second pass/fail determination based on a detection region in the product image included in the acquired data set, and wherein inputting the data set into the second determination model comprises inputting the data set to the second determination model trained to:

extract the detection region from the product image included in the data set;

extract a detection pattern from the detection region; and perform, based on the extracted detection pattern, the second pass/fail determination.

* * * * *